UNITED STATES PATENT OFFICE.

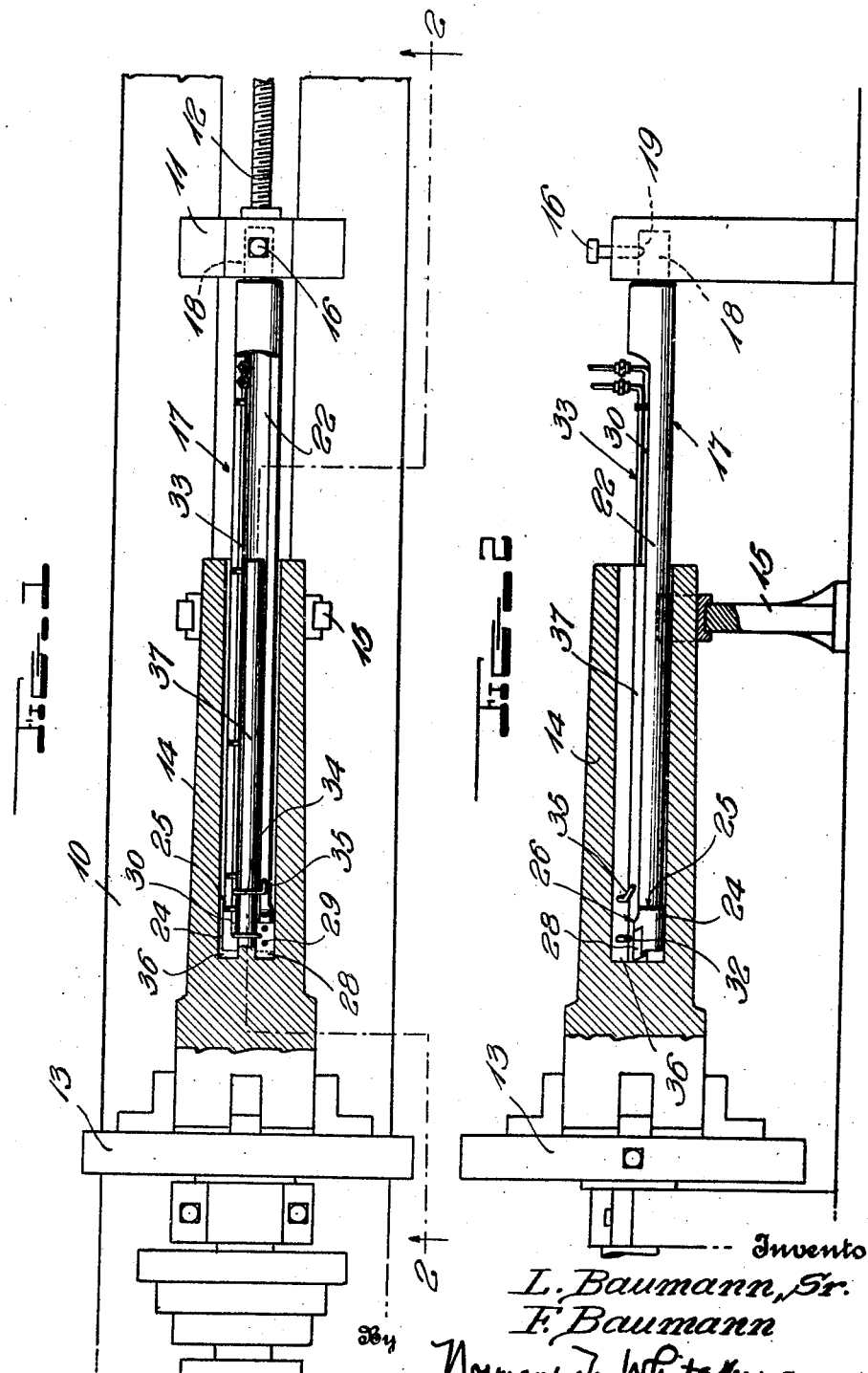

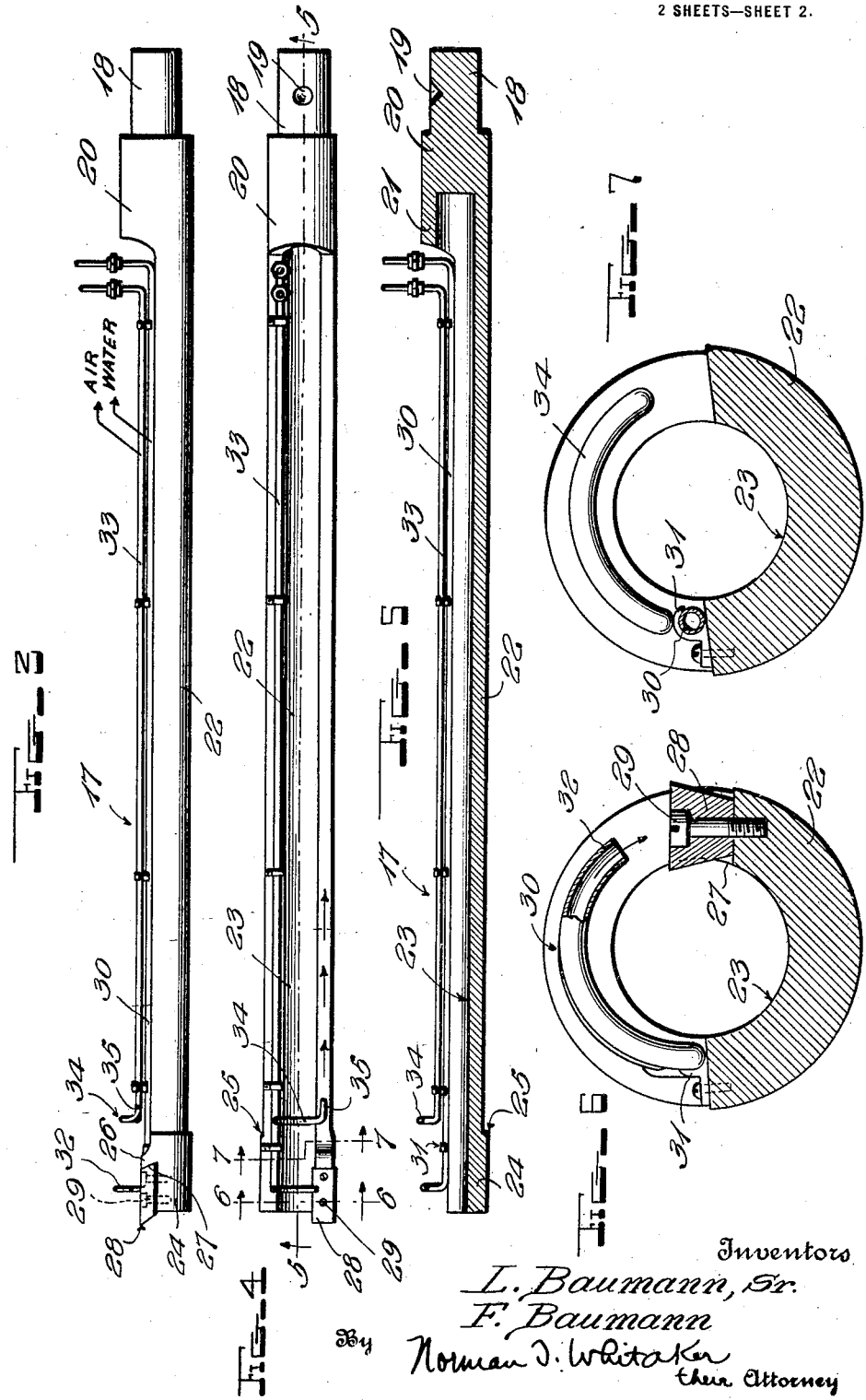

LEOPOLD BAUMANN, SR., AND FREDERICK BAUMANN, OF PHILADELPHIA, PENNSYLVANIA.

TOOL FOR CORING GUN-FORGINGS.

1,322,399.  Specification of Letters Patent.  Patented Nov. 18, 1919.

Application filed June 14, 1919. Serial No. 304,336.

*To all whom it may concern:*

Be it known that we, LEOPOLD BAUMANN, Sr., and FREDERICK BAUMANN, citizens of the United States, residents of Philadelphia, in the county of Philadelphia and State of Pennsylvania, have invented new and useful Improvements in Tools for Coring Gun-Forgings, of which the following is a specification.

This invention relates to improvements in tools for coring, and has particular reference to tools employed in the coring of gun-forgings although not restricted to this particular use.

Heretofore the methods and tools employed in the boring of gun-forgings have proved unsatisfactory not only in that a long period of time is required to perform a boring operation but also in that the boring operation is an exceedingly expensive one. Having this in mind it is therefore an important object of the invention to provide a method of coring and a tool for the same whereby the time consumed and expense encountered in a boring operation may be materially diminished.

Another well known objection to the tools employed in gun-forging boring lies in that an excessive degree of heat is generated not only within the tool employed in the boring operation but also within the object which is undergoing the boring operation. This excessive generation of heat consequently not only impedes the boring operation but tends to deteriorate the cutting qualities of the tool. A further object of the invention is therefore to provide a method whereby both the object to be operated upon and the tool employed in the operation may be maintained at a normal temperature.

Another objection to the well known present day types of tools employed in boring gun-forgings lies in the fact that an excessive waste of material is encountered in the boring operation and therefore it is a further object of the invention to provide a coring tool whereby certain metal which is removed to provide the bore may be maintained in a homogenous state, thereby making possible the utilization of that material which has heretofore resulted in a loss.

A further object of the invention is to provide in a tool of the above mentioned character a means whereby the strain of rotation set up within the tool as a whole when being employed may be distributed in such a manner as to render the tool capable of withstanding any strain imparted to the same during its period of operation as a result of such operation.

A further object of the invention is to provide in a tool of the above mentioned character a means whereby a suitable cooling agent or lubricant may be regularly and constantly employed in connection with the same in order to maintain a normal temperature within the device and throughout the material which is desired to be operated upon.

A further object of the invention is to provide in a tool of the above mentioned character a means whereby the cooling agent or lubricant employed may be utilized as a means for ejecting the cuttings obtained during the coring operation from the path of travel of the tool.

A further object is to provide in a tool of the above mentioned character a means for facilitating the removal of the cooling agent or lubricant together with the cuttings carried thereby from the path of travel of the tool.

A further object is to provide a tool of the above mentioned character which is simple in construction, inexpensive to manufacture, effective in use, and reliable in operation.

Other objects and advantages of this invention will be apparent during the course of the following description.

In the accompanying drawings forming a part of this specification and in which like numerals are employed to designate like parts throughout the same, Figure 1 is a central, horizontal, longitudinal, sectional view of a gun-forging showing the same mounted within a lathe and as being operated upon by the device embodying our invention, the device embodying our invention being shown in top plan.

Fig. 2 is a sectional view of Fig. 1 taken substantially on line 2—2, the device embodying our invention being shown in elevation, Fig. 3 is an enlarged detailed side elevation of the device, Fig. 4 is a top plan of the same, Fig. 5 is a central, vertical, longitudinal, sectional view of Fig. 4 taken on line 5—5, Fig. 6 is a cross sectional view taken on the line 6—6 of Fig. 4, and, Fig. 7 is a cross sectional view taken on a line 7—7 of Fig. 4.

In the drawings, wherein for the purpose of illustration is shown a preferred form of our invention, the numeral 10 indicates a lathe having an adjustable carriage 11 mounted thereon, the carriage 11 being provided with the conventional form of adjusting means which comprises a screw as shown at 12. The lathe 10 is also provided with the conventional form of chuck 13 to which a forging such as a gun-forging 14 is adapted to be centrally secured. Upon the lathe 10 substantially intermediate the carriage 11 and chuck 13 there is mounted a support 15 upon which one end of the gun-forging 14 is adapted to rest in order to maintain the axis of the forging 14 in true alinement with respect to the axis of the chuck 13. To the adjustable carriage 11 there is secured the device embodying our invention, the device being secured to the carriage 11 by means of a set-screw 16 and indicated as a whole by the numeral 17.

This device 17 comprises a shank 18 having a countersink 19 provided therein, which countersink is adapted to receive one end of the set-screw 16 as will be readily understood when considering Figs. 1 and 2. The shank 19 is provided with an enlarged body 20 carrying a sleeve 21. The sleeve 21 is provided with an elongated semi-cylindrical shell 22, the shell 22 being preferably formed integral with the sleeve 21.

It will be noted when considering Figs. 4 to 7 inclusive that the radius of curvature of the inner face 23 of the shell 22 has the same radius of curvature as the inner diameter of the sleeve 21 and that the radii of curvature of the face 23 are equal, that is to say that the shell 22 is provided with an inner face which is symmetrically curved throughout its entire length.

It will also be noted that the shell 22 is provided at one end thereof with a reinforced or enlarged portion 24, the inner face of which has a radius of curvature equal to the radius of curvature of the inner face of the shell 22, the reinforcement 24 being arranged to form a shoulder 25 with respect to the outer face of the shell 22. Upon one side of the reinforcement 24 there is arranged a lug 26 having an angularly disposed face 27. To the reinforced portion there is secured a cutting tool 28 by means of screws or the like 29 one end of which tool is adapted to abut the angularly disposed face 27 as clearly shown in Fig. 3, the other end of the tool being arranged to extend an appreciable distance beyond the outer end of the reinforced portion 24 as clearly shown also in Fig. 3. Upon one edge of the shell 22 there is secured a water supply pipe 30 by means of a plurality of clamps 31. This pipe is adapted to be connected to a suitable source of water supply not shown and extends substantially throughout the length of the shell 22. The end of this pipe is bent to an arcuate shape as clearly shown in Fig. 6 and has its open end 32 arranged in proximity to the cutting tool 28 in order that an adequate supply of water or other cooling agent may be constantly supplied to the cutting tool 28 when the device as a whole is being operated. Upon the water supply pipe 30 there is imposed an air supply pipe 33, the air supply pipe 33 being adapted for connection with a suitable source of air pressure not shown, and secured in position by means of a plurality of clamps substantially identical with those indicated by the numeral 31 as shown. This air supply pipe 33 extends substantially throughout the length of the shell 22 and has its end bent to an arcuate shape as shown at 34. The end of the arcuate shape portion 34 is bent into a parallel relation with respect to the pipes 30 and 33 as shown at 35 in order that a supply of air may be directed in the direction indicated by the arrows shown in Fig. 4.

In use, the operation of the device is as follows: The device as a whole is secured to the adjustable carriage 11, the gun-forging is mounted centrally upon the chuck 13 whereupon rotation is imparted to the chuck 13 in the usual manner causing the gun-forging 14 carried thereby to rotate in a clockwise direction with respect to the device 17 as a whole. The carriage 11 is then moved toward the gun-forging 14, bringing the cutting tool 28 into engagement with the end of the same. As a result of the rotation of the gun-forging 14 with respect to the cutting tool 28 an annular groove 36 equal to the width of the cutting tool will be formed within the gun-forging 14 whereupon a core 37 having a diameter equal to the inner diameter of the sleeve 21 will be formed. During the operation of the device a supply of water is injected into the groove through the pipe 30, the water being supplied directly to the cutting tool 28 from the opened end 32 of the pipe 30. As a result of the supply of water being thus injected into the groove the same will tend to discharge itself from the groove carrying with it the cuttings obtained as a result of the operation of the cutting element 28 upon the gun-forging 14. Should it be desired to facilitate the discharge of the water together with the cuttings from the groove 36 a supply of air may be injected into the groove 36 through the air supply pipe 33. The air upon being injected as desired in the direction indicated by the arrows shown in Fig. 4. As a result of the clockwise motion of the gun-forging 14 with respect to the device as a whole the cuttings obtained by the operation of the cutting tool 28 upon the gun-forging 14 will be caused to travel always along that portion of the shell 22 which carries the arrows shown in Fig. 4. Upon the completion of the operation, that is to say, after the groove 36 has been formed within the gun-forging 14 throughout the length of the same the device 17 as a whole is removed from within the gun-forging whereupon the core 37 is removed with the same. The core 37 being confined within the shell 22 may be easily removed or lifted therefrom.

It is to be understood that the forms of our invention herewith shown and described are to be taken as preferred examples of the same, and that various changes in the shape, size and arrangement of parts may be resorted to without departing from the spirit of the invention or the scope of the subjoined claims.

Having thus described our invention, what we claim as new and desire to secure and protect by Letters Patent of the United States, is:

1. A gun-forging coring tool comprising a segmental shell the inner curved surface of which constitutes an arc of not more than 180°, and a cutting element carried by said shell at its end.

2. A gun-forging coring tool comprising a segmental shell the inner curved surface of which constitutes an arc of substantially 180°, and a cutting element carried by said shell at its end.

LEOPOLD BAUMANN, Sr.
FREDERICK BAUMANN.